United States Patent

Mohan et al.

[11] Patent Number: 6,145,644
[45] Date of Patent: *Nov. 14, 2000

[54] MULTI-FUNCTION CONTROL VALVE FOR HYDRAULIC COUPLING

[75] Inventors: Sankar K. Mohan, Syracuse; Timothy M. Burns, Jordan, both of N.Y.

[73] Assignee: New Venture Gear, Inc., Troy, Mich.

[*] Notice: This patent is subject to a terminal disclaimer.

[21] Appl. No.: 09/359,833

[22] Filed: Jul. 23, 1999

Related U.S. Application Data

[63] Continuation of application No. 09/174,519, Oct. 16, 1998, Pat. No. 5,967,285.

[51] Int. Cl.$^7$ ................................................ B60K 17/348
[52] U.S. Cl. .................................. 192/103 F; 192/70.12; 192/82 T; 192/85 AA; 192/113.34
[58] Field of Search .................................. 192/103 F, 35, 192/82 T, 85 AA, 70.12, 113.34

[56] References Cited

U.S. PATENT DOCUMENTS

| | | |
|---|---|---|
| 4,031,780 | 6/1977 | Dolan et al. . |
| 4,650,028 | 3/1987 | Eastman et al. . |
| 4,821,604 | 4/1989 | Asano . |
| 4,924,989 | 5/1990 | Filderman . |
| 5,148,900 | 9/1992 | Mohan . |
| 5,176,235 | 1/1993 | Williams . |
| 5,358,454 | 10/1994 | Bowen et al. . |
| 5,405,293 | 4/1995 | Severinsson . |
| 5,536,215 | 7/1996 | Shaffer et al. ............................ 475/88 |
| 5,632,185 | 5/1997 | Gassmann . |
| 5,649,459 | 7/1997 | Murakami et al. . |
| 5,704,863 | 1/1998 | Zalewski et al. . |
| 5,735,764 | 4/1998 | Shaffer et al. . |
| 5,779,013 | 7/1998 | Bansbach . |
| 5,890,574 | 4/1999 | Takahashi . |

*Primary Examiner*—Charles A Marmor
*Assistant Examiner*—Saúl Rodriguez
*Attorney, Agent, or Firm*—Harness, Dickey & Pierce, P.L.C.

[57] ABSTRACT

A hydraulic coupling including a multi-plate clutch assembly operably connecting two relatively rotatable members and an actuator assembly for actuating the clutch assembly in response to speed differentiation between the two rotary members. The actuator assembly includes a hydraulic pump, a piston disposed in a piston chamber, and a fluid distribution system including a first flow path for supplying hydraulic fluid from a sump to the hydraulic pump and a second flow path for supplying hydraulic fluid from the hydraulic pump to the piston chamber. Hydraulic pressure in the piston chamber controls the magnitude of the clutch engagement force exerted by the piston on the clutch assembly. The fluid distribution system further includes a third flow path between the piston chamber and a clutch chamber. A control valve assembly is located in the third flow path and provides a flow control function for regulating the fluid pressure in the piston chamber and supplying fluid to the clutch chamber for cooling the clutch assembly. The control valve assembly also provides a pressure relief function for limiting the fluid pressure in the piston chamber to a predetermined maximum value, and a thermal unload feature for venting the piston chamber when the fluid temperature exceeds a predetermined maximum value.

31 Claims, 6 Drawing Sheets

MULTI-FUNCTION CONTROL VALVE FOR HYDRAULIC COUPLING

This is a continuation of U.S. patent application Ser. No. 09/174,519, filed Oct. 16, 1998 now U.S. Pat. No. 5,967,285.

BACKGROUND OF THE INVENTION

The present invention relates generally to hydraulic couplings for use in motor vehicle driveline applications. More specifically, the hydraulic coupling includes a hydraulic pump, a transfer clutch coupled between a pair of rotary members, and a fluid distribution system including a control valve assembly operable for controlling actuation of the transfer clutch.

Hydraulic couplings are used in a variety of motor vehicle driveline applications for limiting slip and transferring drive torque between a pair of rotary members. In all-wheel drive applications, hydraulic couplings have been used to automatically control the transfer of drive torque from a driven member to a non-driven member in response to speed differentiation therebetween. In limited slip applications, such as used in association with a differential in an axle assembly, full-time transfer case, or transaxle, hydraulic couplings have been used to limit slip and bias the torque split between two rotary members. Examples of known hydraulic couplings which are adaptable for such driveline applications include viscous couplings, geared traction units, and passively and electronically-controlled hydraulically-actuated friction clutches generally similar to those shown and described in U.S. Pat. Nos. 5,148,900, 5,358,454, 5,649,459, 5,704,863 and 5,779,013.

SUMMARY OF THE INVENTION

It is an object of the present invention to provide a hydraulic coupling for use in motor vehicle driveline applications that is operable for limiting speed differentiation and transferring drive torque between two rotary members.

In accordance with this object, the hydraulic coupling includes a multi-plate clutch assembly operably connecting two relatively rotatable members, and an actuator assembly for actuating the clutch assembly in response to speed differentiation between the two rotary members. The actuator assembly includes a hydraulic pump, a piston disposed in a piston chamber, and a fluid distribution system including a first flow path for supplying hydraulic fluid from a sump to the hydraulic pump and a second flow path for supplying hydraulic fluid from the hydraulic pump to the piston chamber. Hydraulic pressure in the piston chamber controls the magnitude of the clutch engagement force exerted by the piston on the clutch assembly. The fluid distribution system further includes a third flow path between the piston chamber and a clutch chamber. A control valve assembly is located in the third flow path and provides a flow control function for regulating the fluid pressure in the piston chamber and supplying fluid to the clutch chamber for cooling the clutch assembly.

As an additional feature of the hydraulic coupling, the flow control function provided by the control valve assembly is thermally compensating for accommodating viscosity changes due to heating of the hydraulic fluid. Furthermore, the flow control function is speed compensating for varying the engagement characteristics of the clutch assembly as a function of vehicle speed.

As a further feature of the hydraulic coupling, the control valve assembly provides a pressure relief function for setting a maximum pressure within the piston chamber.

As still a further feature of the hydraulic coupling, the control valve assembly provides a thermal unload function for releasing the pressure within the piston chamber when the fluid temperature exceeds a predetermined temperature value.

BRIEF DESCRIPTION OF THE DRAWINGS

Further objects, features and advantages of the present invention will become readily apparent from the following detailed specification and the appended claims which, in conjunction with drawings, set forth the best mode now contemplated for carrying out the invention. Referring to the drawings:

DETAILED DESCRIPTION OF THE INVENTION

In general, the present invention is directed to a hydromechanical limited slip and torque transfer apparatus, hereinafter referred to as a hydraulic coupling. Driveline applications for the hydraulic coupling include, but are not limited to, limited slip axle differentials, power take-offs and in-line coupling for all wheel drive vehicles, on-demand couplings and limited slip differentials in four-wheel drive transfer cases, limited slip differentials in transaxles, and any other type of driveline apparatus for transferring drive torque and limiting slip between two rotary members.

Figure 1:
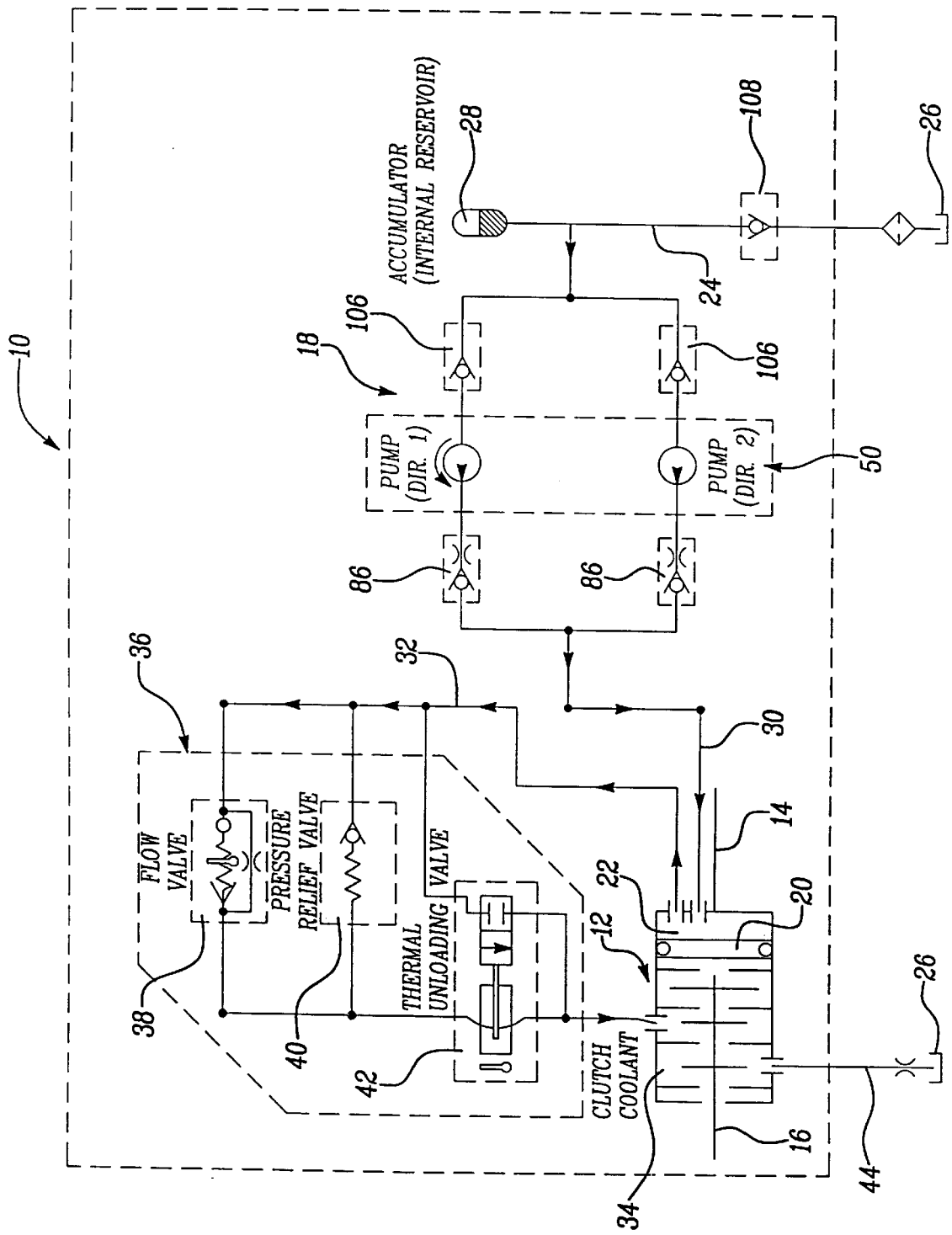
FIG. 1 is a schematic illustration of a hydraulic circuit associated with the hydraulic coupling of the present invention.

Referring to FIG. 1 of the drawings, a hydraulic circuit for a hydraulic coupling 10 is schematically shown to include a transfer clutch 12 coupled between a first rotary member 14 and a second rotary member 16, a pump assembly 18, a piston 20 disposed in a piston chamber 22, and a fluid distribution system for regulating the fluid pressure delivered by pump assembly 18 to piston chamber 22. The fluid distribution system includes a first flow path 24 for supplying hydraulic fluid from a sump 26 to a reservoir 28 located on the suction side of pump assembly 18, and a second flow path 30 for supplying hydraulic fluid from reservoir 28 to piston chamber 22 located on the discharge side of pump assembly 18. The fluid distribution system further includes a third flow path 32 for supplying hydraulic fluid from piston chamber 22 to a clutch chamber 34 within transfer clutch 12. A control valve assembly 36 is located in third flow path 32 and is operable to provide three functional modes of operation. The first function, hereinafter referred to as the flow control function, is schematically indicated by a flow control valve 38. The second function, hereinafter referred to as the pressure relief function, is schematically indicated by pressure relief valve 40. Finally, the third function, hereinafter referred to as the thermal unload function, is indicated by a thermal unload valve 42. With each function, fluid discharged through control valve assembly 36 is delivered to clutch chamber 34 for use in cooling the clutch plates in transfer clutch 12 and is then returned to sump 26 via a fourth flow path 44. However, in other driveline arrangements, the fluid discharged from control valve assembly 36 could be returned to sump 26.

Figure 2:
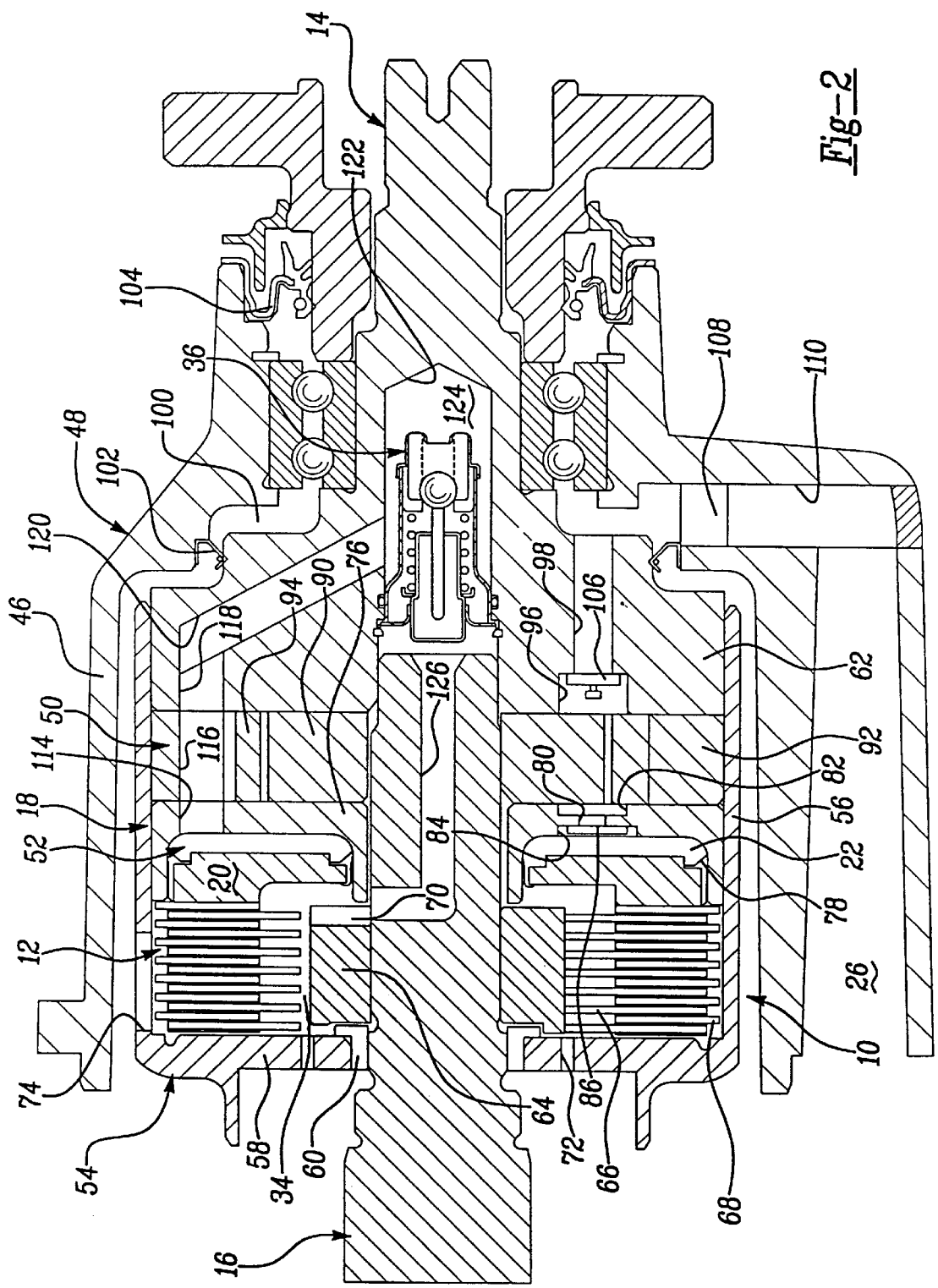
FIG. 2 is a sectional view of the hydraulic coupling shown operatively interconnected between a pair of rotary shafts.
Figure 3:
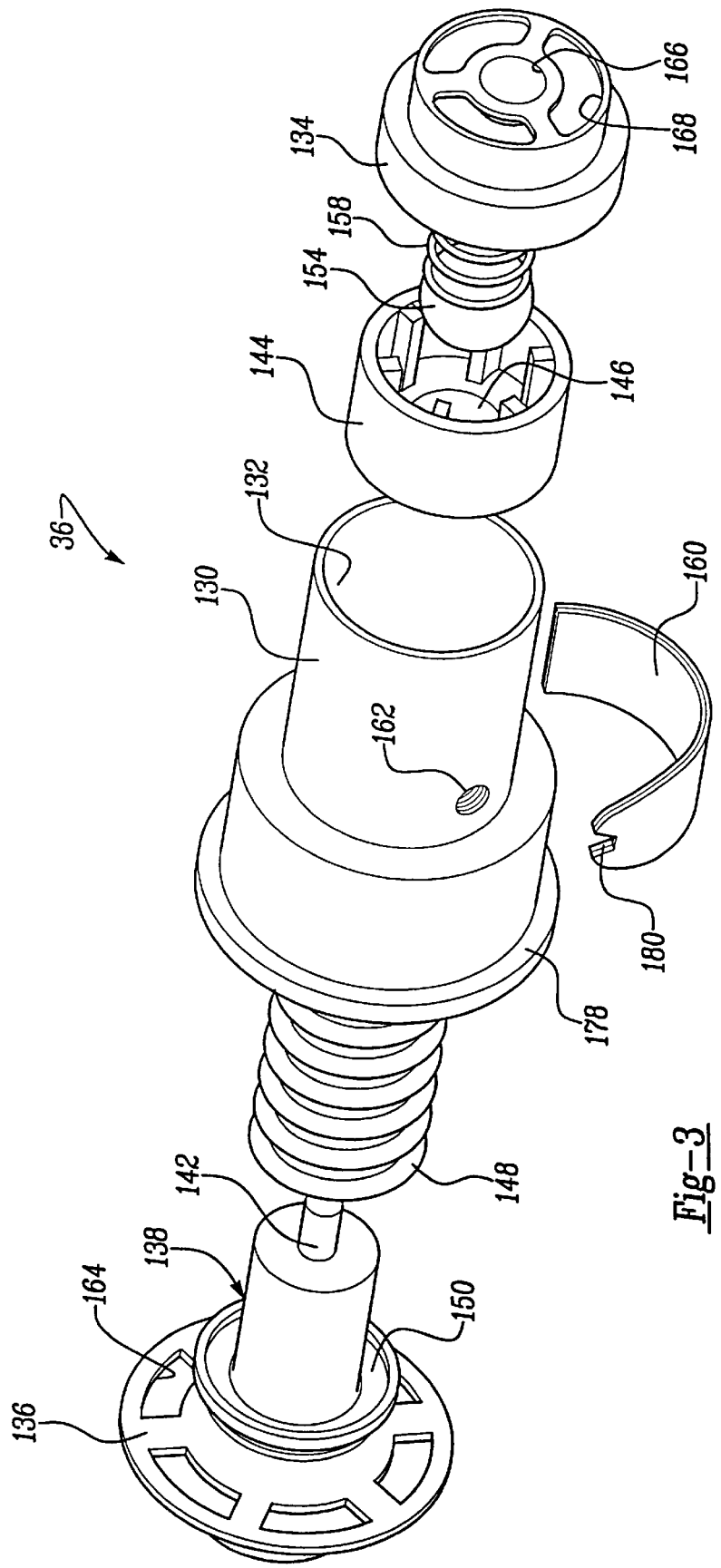
FIG. 3 is an exploded perspective view of a control valve assembly incorporated into the hydraulic circuit of FIG. 1 and the hydraulic coupling of FIG. 2.

Referring now to FIG. 2, hydraulic coupling 10 is shown installed in a casing 46 of a driveline apparatus 48 and is arranged to operatively couple first rotary member, hereinafter identified as first shaft 14, to second rotary member, hereinafter identified as second shaft 16. As is conventional shafts 14 and 16 are supported for rotation relative to casing 46 and to each other using suitable bearings and/or bushings. In general, hydraulic coupling 10 is illustrated to include pump assembly 18 and transfer clutch 12 that are operably arranged to automatically and progressively transfer drive torque to the slower rotating shaft in response to excessive speed differentiation therebetween. According to the embodiment shown, pump assembly 18 includes a bi-directional hydraulic pump 50 and a piston assembly 52 while transfer clutch 12 is a hydraulically-actuated multi-plate clutch assembly. Both pump assembly 18 and transfer clutch 12 are confined within a drum housing 54 having a cylindrical outer drum 56 and an end plate 58 that is supported by a bushing 60 for rotation relative to second shaft 16. A valvebody segment 62 of first shaft 14 is fixed (i.e., splined or welded) to outer drum 56 such that drum housing 54 drives or is driven by first shaft 14.

With continued reference to FIG. 2, transfer clutch 12 is shown to include a clutch hub 64 fixed (i.e., splined) to second shaft 16, and an interleaved clutch pack comprised of a plurality of inner clutch plates 66 fixed (i.e., splined) to clutch hub 64 which are alternately interleaved with a plurality of outer clutch plates 68 fixed (i.e., splined) to outer drum 56. Lubrication slots 70 formed in clutch hub 64 and lubrication ports 72 and 74 formed through end plate 58 and outer drum 56, respectively, of drum housing 54 are provided for supplying hydraulic fluid to clutch chamber 34 for cooling clutch plates 66 and 68. Piston assembly 52 includes a piston housing 76 fixed (i.e., splined) for rotation with outer drum 56 and a piston 20 disposed in an annular piston chamber 22 formed in piston housing 76. Preferably, piston 20 has a cover material 78 bonded thereto, such as rubber, to provide for sealed sliding engagement with respect to inner and outer edge surfaces of piston chamber 22. Thus, piston 20 is supported in piston chamber 22 for axial sliding movement relative to the interleaved multi-plate clutch pack for applying a compressive clutch engagement force thereon, thereby transferring drive torque from first shaft 14 (via drum housing 54) to second shaft 16 (via clutch hub 64) or vise versa. The amount of drive torque transferred is progressive in that it is proportional to the magnitude of the clutch engagement force exerted by piston 20 on the clutch pack which, in turn, is a function of the fluid pressure within piston chamber 22. Moreover, the magnitude of the fluid pressure in piston chamber 22 is regulated by control valve assembly 36.

Piston housing 76 has a valving arrangement that is operable for controlling the delivery of fluid under pressure to piston chamber 22 from hydraulic pump 50. In particular, a pair of transfer ports 80 (one shown) are formed through piston housing 76 and each extends between and communicates with a corresponding one of a pair of pump outlet slots 82 and piston inlet slots 84. A check valve 86 is mounted in each of piston inlet slots 84. Preferably, check valves 86 are reed valve elements mounted by rivets to piston housing 76 for movement between "open" and "closed" positions with respect to transfer ports 80. Based on the direction of relative rotation between shafts 14 and 16 (which results in a corresponding directional rotation of hydraulic pump 50 in a first direction), one check valve 86 will move to an "open" position away from piston housing 76 and its corresponding transfer port 80 due to the pumping action of hydraulic pump 50 for permitting the flow of hydraulic fluid from the corresponding pump outlet slot 82 into piston chamber 22. Concurrently, the other check valve 86 is maintained in a "closed" position relative to piston housing 76 for inhibiting the discharge of the hydraulic fluid from piston chamber 22 into the other pump outlet slot 82 through its corresponding transfer port 80. As such, the hydraulic fluid in piston chamber 22, if it exceeds a predetermined minimum pressure, will actuate transfer clutch 12 by moving piston 20 into engagement with the clutch pack for applying the resultant clutch engagement force thereon. During the opposite direction of relative rotation between shafts 14 and 16, the open and closed positions mentioned above are reversed for transfer ports 80. Upon cessation of the pumping action, both check valves 86 are biased to return to their respective closed positions for maintaining a supply of fluid in piston chamber 22. Thus, check valves 86 function as a normally-closed check valve.

Hydraulic pump 50 is operable for pumping hydraulic fluid through transfer ports 80 and into piston chamber 22 for actuating transfer clutch 12 in response to differential rotation between shafts 14 and 16. Preferably, hydraulic pump 50 is a rotary type bi-directional pump capable of pumping fluid at a rate proportional to the speed difference between shafts 14 and 16. According to a preferred construction, hydraulic pump 50 is a bi-directional gerotor pump assembly comprised of a pump ring 90 fixed (i.e., splined) for rotation with second shaft 16, an eccentric ring 92 fixed (i.e., splined) for rotation with drum housing 54, and a stator ring 94 operably disposed therebetween. Pump ring 90 has a plurality of external teeth that rotate concentrically relative to shaft 16 about a common rotational axis. Stator ring 94 includes a plurality of internal lobes and has an outer circumferential edge surface that is journally rotatably supported within a circular internal bore formed in eccentric ring 92. The internal bore is offset from the common rotational axis such that, due to meshing of the internal lobes of stator ring 94 with the external teeth of pump ring 90, relative rotation between pump ring 90 and eccentric ring 92 causes eccentric rotation of stator ring 94. Based on the direction of relative rotation, this eccentric rotary arrangement results in a pumping action for supplying fluid under pressure from one of a pair of pump inlet slots 96 (one shown) formed in valvebody segment 62 of first shaft 14 to a corresponding one of pump outlet slots 82. Preferably, stator ring 94 has a number of lobes that is one more than the number of teeth provided on pump ring 90. As an alternative, hydraulic pump 50 could be a gear pump or any other fluid pump operable for generating hydraulic pressure in response to relative rotation between two members.

Referring primarily to FIG. 2, hydraulic pump 50 is shown operably installed between piston housing 76 and valvebody segment 62. As noted, valvebody segment 62 of first shaft 14 is fixed for rotation with drum housing 54. Valvebody segment 62 of first shaft 14 includes a series of inlet ports 98 formed within each of pump inlet slots 96 that are in fluid communication with an internal reservoir 28 defined by a supply chamber 100 located on a supply side of the hydraulic pump 50. Supply chamber 100 is located between valvebody segment 62 of first shaft 14 and housing 46 of driveline apparatus 48 and seals 102 and 104 are provided for sealing supply chamber 100 relative to casing 46. A check valve 106 is mounted within each pump inlet slot 96 for controlling the delivery of fluid from supply chamber 100 through inlet ports 98 to pump inlet slots 96. Check valves 106 are preferably reed valve elements mounted on rivets to valvebody segment 62 of first shaft 14 which are movable from a "closed" position to an "open" position relative to inlet ports 98 in response to the pumping action of hydraulic pump 50. Rotation in a first direction causes one of check valves 106 to move to its open position while the other check valve 106 is maintained in its closed position. Obviously, opposite rotation causes opposite movement of check valves 106. Upon cessation of the pumping action, check valves 106 return to their normally closed positions for maintaining a supply of fluid within pump inlet slots 96. Moreover, an inlet check valve 108 is shown mounted in an inlet passage 110 formed in casing 46 of driveline apparatus 48 for permitting fluid to be drawn from sump 26 into supply chamber 100 due to the pumping action of hydraulic pump 50. Check valve 108 is normally closed for maintaining a supply of fluid in supply chamber 100.

As noted, hydraulic coupling 10 includes a third flow path 32 between piston chamber 22 and clutch chamber 34 within which control valve assembly 36 is mounted. In particular, third flow path 32 is defined by a series of interconnected flow passages including a bore 114 through piston housing 76, a bore 116 through eccentric ring 92, and bores 118 and 120 formed in valvebody segment 62 which communicate with a bore 122 formed in the end of first shaft 14. As seen, bores 114, 116 and 118 are axially aligned and an optional alignment tube (not shown) may be mounted therein. Control valve assembly 36 is mounted in bore 122 to define a flow control chamber 124 that is in fluid communication with piston chamber 22. As will be detailed, control valve assembly 36 functions to control the flow of fluid from flow control chamber 124 into a lubrication passage 126 formed in the end of second shaft 16 which communicates with clutch hub slots 70 to permit fluid to flow into clutch chamber 34. Thus, fluid discharged from control valve assembly 36 is used to cool and lubricate the clutch pack in transfer clutch 12.

Referring primarily to FIGS. 3 through 7, the construction and various functional modes of operation for control valve assembly 36 will now be described. Control valve assembly 36 includes a tubular housing 130 defining a valve chamber 132, an inlet cap 134 fixed to one end of housing 130, an outlet plate 136 fixed to the opposite end of housing 130, a thermal actuator 138 mounted in a central aperture 140 formed in outlet plate 136 and having an axially movable post 142 located in valve chamber 132, a cup-shaped piston 144 slidably mounted in valve chamber 132 and having an aperture 146 into which the distal end of post 142 extends, a first spring 148 extending between a spring retainer 150 mounted on thermal actuator 138 and an end surface 152 of piston 144, a valve ball 154 positioned in piston 144 for movement relative to aperture 146 and in engagement with the terminal end of post 142, a second spring 156 extending between valve ball 154 and a spring retainer flange 158 on inlet cap 134, and an elongated bimetallic valve 160 having a first end fixed to housing 130 and a second end overlying a flow port 162 formed in housing 130. As seen, flow port 162 provides a flow path between flow control chamber 124 and valve chamber 132. Bimetallic valve 160 is adapted to move from an open position displaced from flow port 162 to a closed position blocking flow port 162 based on the fluid pressure acting thereon within flow control chamber 124. In addition, a bleed slot 163 is formed in the second end of bimetallic valve 160 which permits bleed flow from flow control chamber 124 into valve chamber 132 when bimetallic valve 160 is in its closed position. A series of arcuate outlet ports 164 are informed in outlet plate 136 to permit fluid in valve chamber 132 to communicate with lubrication passage 126. Moreover, a central port 166 and a series of arcuate ports 168 are formed in inlet cap 134 to provide fluid communication between flow control chamber 124 and a pressure relief chamber 170 defined within piston 144.

Figure 4:
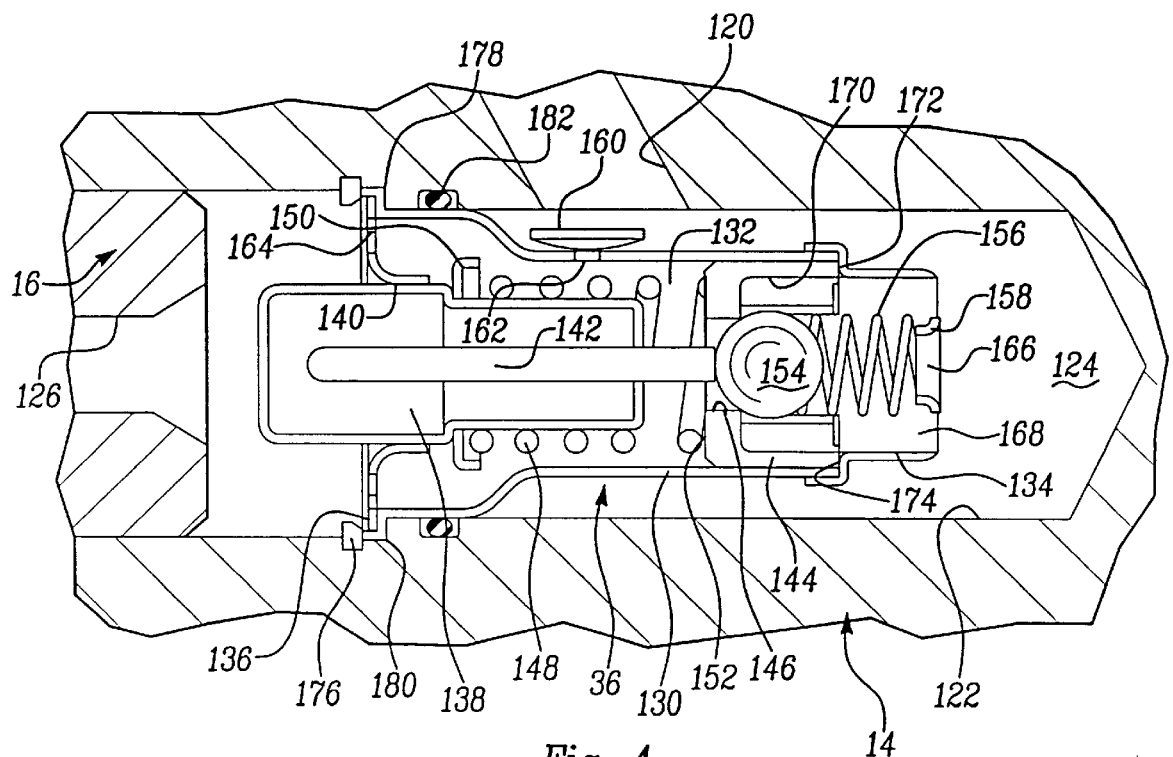
FIG. 4 is a partial sectional view showing the control valve assembly mounted in one of the rotary shafts and operating in its normal mode.

As best seen from FIG. 4, the second end of bimetallic valve 160 is normally biased to an open position displaced from flow port 162. Furthermore, first spring 148 is operable for normally biasing piston 144 to a first position whereat its end surface 172 engages a radial stop surface 174 of inlet cap 134. Likewise, second spring 156 is operable for normally biasing valve ball 154 to a first position which, with piston 144 in its first position, causes valve ball 154 to seat against aperture 146 for preventing flow from pressure relief chamber 170 into valve chamber 132. A snap ring 176 is used to retain an annular flange 178 of housing 130 against a radial shoulder surface 180 in bore 122 while an O-ring seal 182 is mounted between housing 130 and bore 122 to provide a seal between flow control chamber 124 and lubrication passage 126. Thus, fluid delivered to piston chamber 22 from hydraulic pump 50 is normally routed through third flow path 32 and continues to flow from flow control chamber 124 into clutch chamber 34 through flow port 162, valve chamber 132, outlet ports 164 and supply passage 126.

Figure 5:
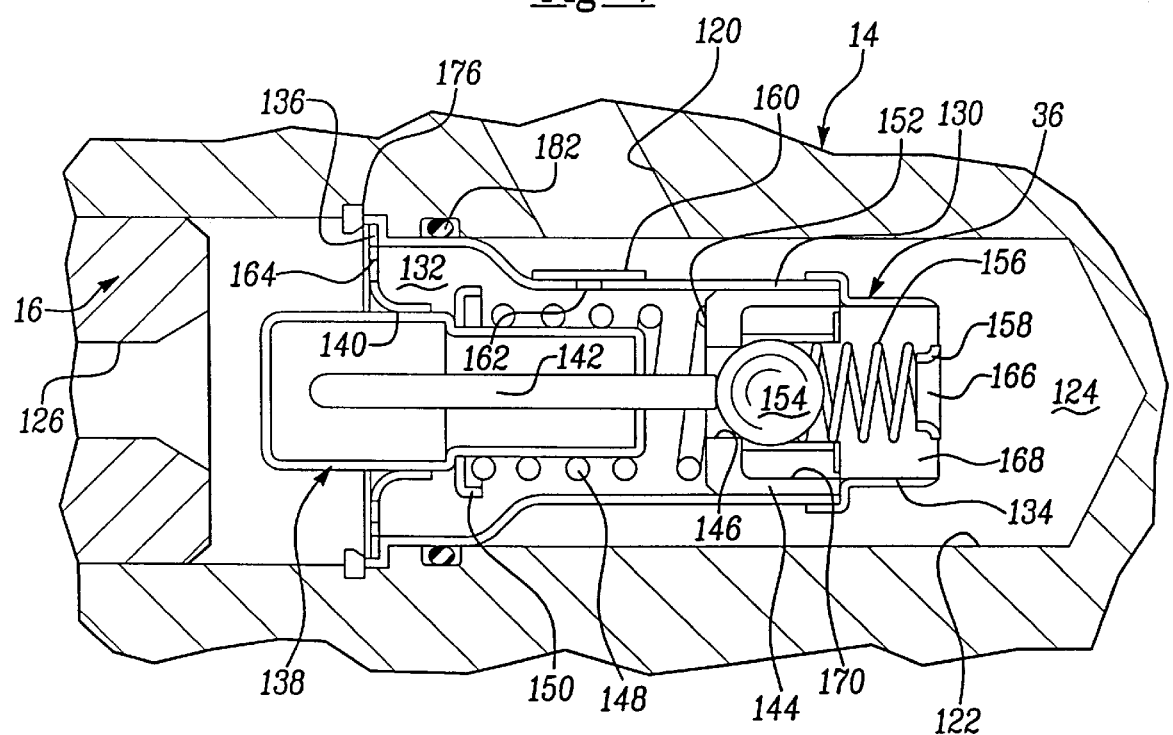
FIG. 5 is a sectional view, similar to FIG. 4, showing the control valve assembly operating in a flow control mode.

As noted, control valve assembly 36 provides three distinct functional modes of operation. First, bimetallic valve 160 functions as a flow control valve (as represented in the hydraulic circuit of FIG. 1 by reference numeral 38) for regulating the flow of hydraulic fluid between flow control chamber 124 and valve chamber 132 which, in turn, controls the pressure in piston chamber 22 used for actuating transfer clutch 12. In operation, when the speed differential (ΔRPM) between shafts 14 and 16 is less than a certain actuation value, the pressure in flow control chamber 124 generated by the flow of fluid through third flow path 32 permits the second end of bimetallic valve 160 to remain in its open position, as shown in FIG. 4. However, when the speed differential exceeds the actuation value, the fluid pressure in flow control chamber 124 causes the second end of bimetallic valve 160 to move to its closed position, as shown in FIG. 5. With bimetallic valve 160 in its closed position, flow through flow port 162 is inhibited such that a substantial increase in the fluid pressure in piston chamber 22 results which, in turn, causes piston 20 to exert a large clutch engagement force on the interleaved clutch pack for actuating transfer clutch 12. Once relative rotation between shafts 14 and 16 has ceased, the bleed flow of fluid from flow control chamber 124 to valve chamber 132 through bleed slot 163 and flow port 162 functions to reduce the pressure in piston chamber 22 for disengaging transfer clutch 12 and permitting subsequent movement of bimetallic valve 160 to its open position.

As a further feature, bimetallic valve 160 is thermally compensating for accommodating temperature gradients caused during cyclical heating and cooling of the hydraulic fluid. More specifically, due to its construction of two metallic strips laminated together having different thermal expansion coefficients, the second end of bimetallic valve 160 is caused to move relative to flow port 162 as its temperature is varied for controlling flow through flow port 162 independent of changes in the viscosity of the hydraulic fluid caused by such temperature variations. In addition to being thermally-compensating, bimetallic valve 160 is also speed dependent for delaying engagement of transfer clutch 12 at higher vehicle speeds. Specifically, the spring function of bimetallic valve 160 provides a centrifugal effect for delaying movement of the second end of bimetallic valve 160 to its closed position as a function of increasing rotary speed of first shaft 14. In this regard, the centrifugal effect caused by increasing rotary speed of first shaft 14 requires a higher flow rate to close bimetallic valve 160, whereby a greater speed differential is required to overcome the centrifugal resistance and move the second end of bimetallic valve 160 to its closed position.

Figure 8A:
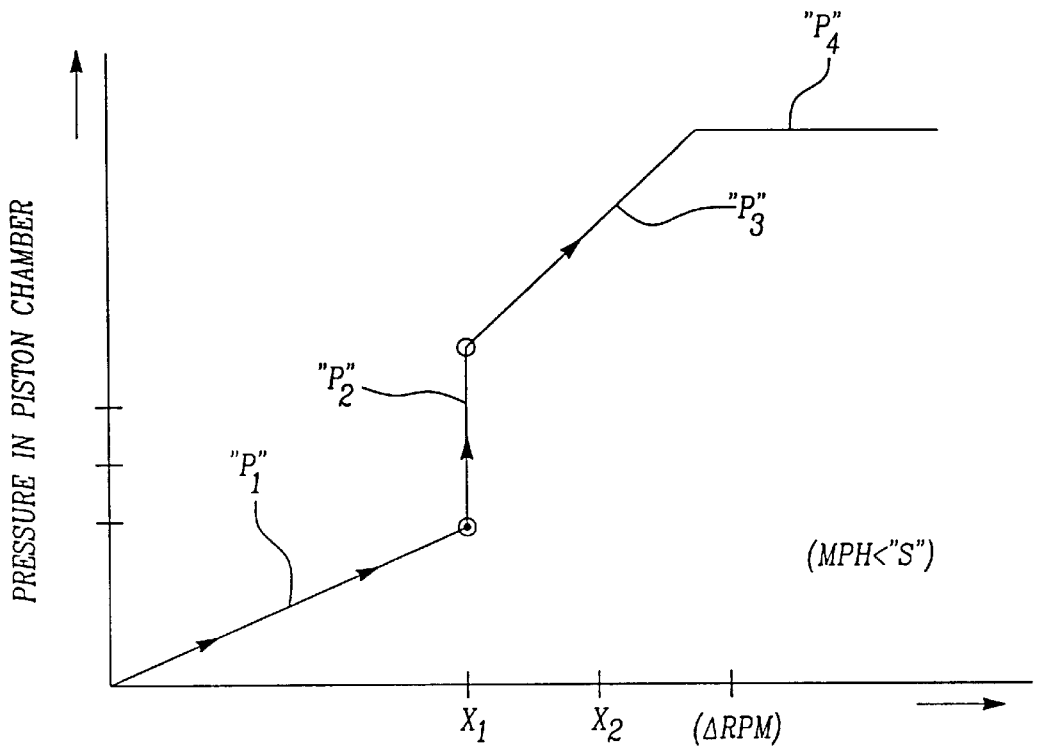
FIGS. 8A and 8B are plots showing ΔRPM vs Pressure characteristics for the hydraulic coupling at different vehicle speeds.
Figure 8B:
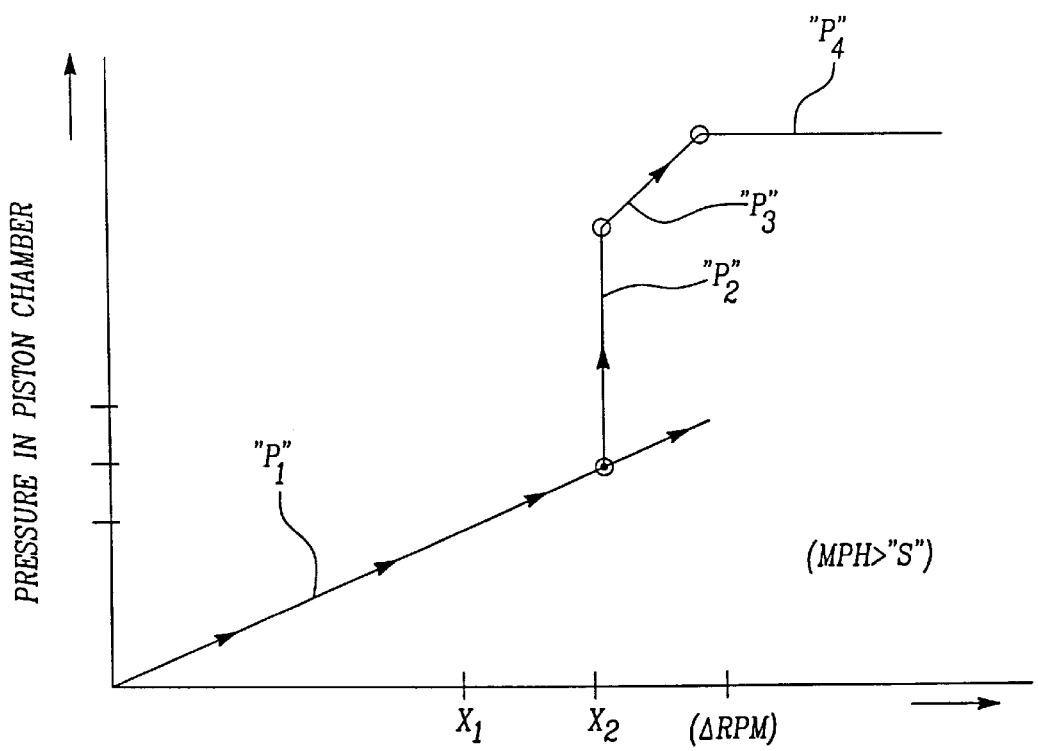

To better illustrate the speed-compensating feature of the flow control function associated with control function associated with control valve assembly 36, reference is now made to the exemplary plots illustrated in FIGS. 8A and 8B. In each plot, line "$P_1$" indicates the relationship between the pressure in piston chamber 22 and the speed differential (ΔRPM) values when bimetallic valve 160 is maintained in its open position. Referring to FIG. 8A, when the vehicle speed is in an initial speed range (mph<"S"), bimetallic valve 160 is not affected by the centrifugal effect caused by rotation of first shaft 14. As such, bimetallic valve 160 only moves to its closed position when the ΔRPM value equals a minimum actuation value "$X_1$". At this point, a significant pressure rise occurs in piston chamber 22, as indicated by line "$P_2$", for actuating transfer clutch 12. Thereafter, any further increases in ΔRPM values cause a pressure increase along line "$P_3$" due to bleed flow through bleed slot 163. A maximum pressure, indicated by line "$P_4$" is established by operation of the pressure relief function of control valve assembly 36 described hereinafter. In contrast, FIG. 8B shows closure of bimetallic valve 160 at an increased ΔRPM value "$X_2$" when the vehicle speed is greater than the initial speed range (mph>"S") due to centrifugal forces acting on bimetallic valve 160 in response to higher rotational speed of first shaft 14. As such, the pressurization of piston chamber 20, as indicated by line "$P_2$", is delayed compared to FIG. 8A. Thus, at higher rotary speeds of first shaft 14, a larger speed differential is required to actuate transfer clutch 12.

Figure 6:
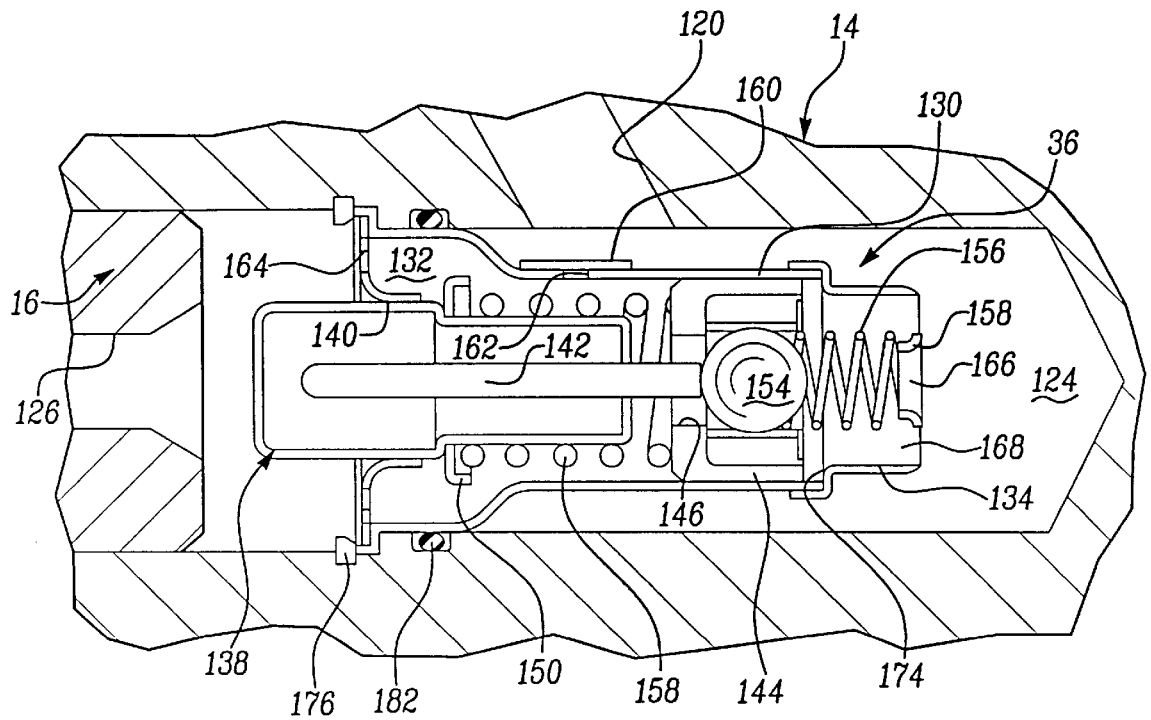
FIG. 6 is a sectional view showing the control valve assembly operating in a pressure relief mode.

Referring now to FIGS. 5 and 6, the pressure relief function of control valve assembly 36 (identified schematically by pressure relief valve 40 in FIG. 1) will be described. As seen from FIG. 5, when the fluid pressure in flow control chamber 124 is sufficient to close bimetallic valve 160 but is still below a predetermined maximum value, piston 144 is maintained in its first position by first spring 148, thereby preventing flow from pressure relief chamber 170 into valve chamber 132 through aperture 146. However, when the pressure in flow control chamber 124 exceeds this maximum value, piston 144 is forced to move from its first position to a second position (FIG. 6) in opposition to the biasing exerted thereon by first spring 148. Concurrently, valve ball 154 is held in its first position between post 142 and spring 156. As such, fluid in pressure relief chamber 170 is permitted to flow through aperture 146 into valve chamber 132. Once the pressure in piston chamber 22 is reduced below the maximum value, first spring 148 urges piston 144 to return to its first position with valve ball 154 again blocking flow of fluid through aperture 146.

Figure 7:
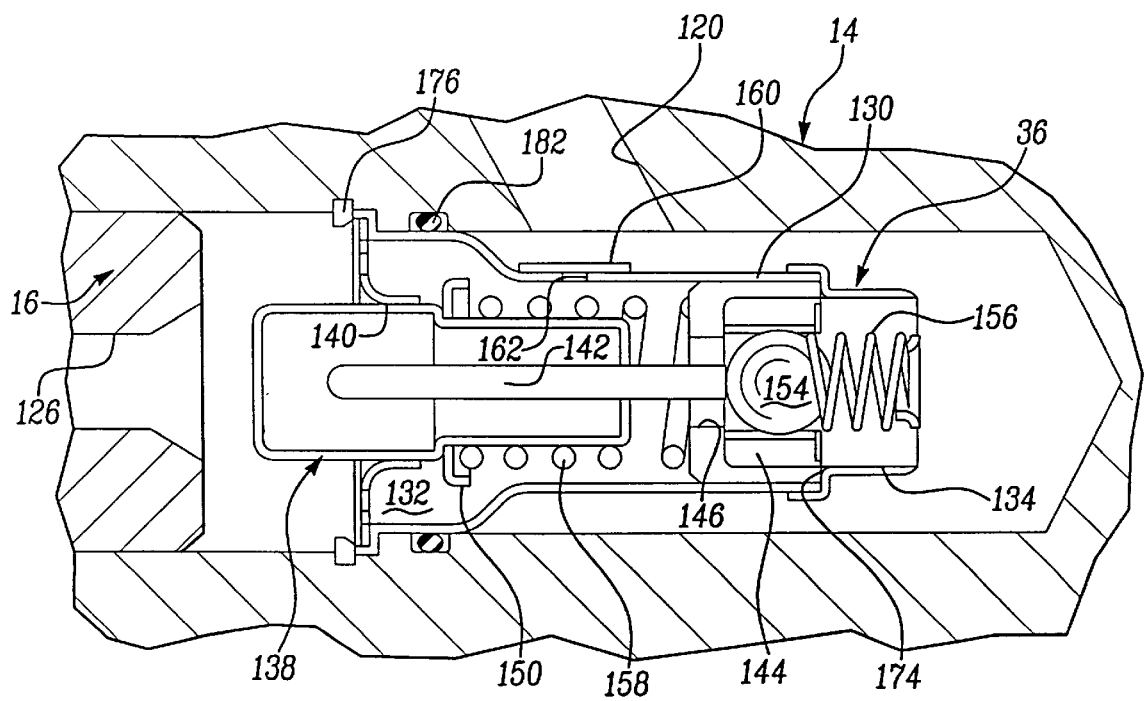
FIG. 7 is a sectional view showing the control valve assembly operating in a thermal unload mode.

Referring now to FIGS. 5 and 7, the thermal unload function of control valve assembly 36 will be described. In particular, when the fluid temperature exceeds a predetermined temperature value, thermal actuator 138 causes post 142 to move axially from a retracted position (FIG. 5) to an extended position (FIG. 7). Such movement of post 142 causes valve ball 154 to move from its first position (FIG. 5) to a second position (FIG. 7) displaced from aperture 146 in opposition to the biasing of second spring 156. During extended periods of actuation of transfer clutch 12, bleed slot 163 in the second end of bimetallic valve 160 permits fluid in flow control chamber 124 to bleed into valve chamber 132 and act on thermal actuator 138 even when bimetallic valve 160 is in its closed position. Thermal actuator 138 is of a type manufactured by Therm-Omega-Tech of Warminster, Pa. or Standard-Thomson of Walthan, Mass. Once control valve assembly 36 has unloaded piston chamber 22 and disengaged transfer clutch 12, the fluid and thermal actuator 38 will eventually cool to a temperature below the predefined value, whereby post 142 will return to its retracted position for resetting the thermal unload function.

Flow control valve assembly 36 can be installed in other portions of hydraulic coupling 10 to package for different application. Also, bleed slot 163 can be formed in housing 130 to communicate directly with flow port 162 instead of being formed in bimetallic valve 160. Alternatively, bleed slots 163 can be formed in piston aperture 146 to allow bleed flow around valve ball 154. Such variations are clearly considered as contemplated equivalents. Moreover, the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydraulic coupling for use in a driveline apparatus having a sump containing hydraulic fluid to rotatively couple first and second rotary members, the hydraulic coupling comprising:

a transfer clutch connected between the first and second rotary members;

a piston disposed in a piston chamber and actuatable to engage said transfer clutch and rotatively couple the first and second rotary members;

a hydraulic pump for pumping hydraulic fluid from the sump to said piston chamber in response to relative rotation between the first and second rotary members; and a control valve assembly located in a flow path providing fluid communication between said piston chamber and the sump, said control valve assembly having a thermal unload valve for venting fluid from said piston chamber to the sump when the fluid temperature exceeds a predetermined maximum temperature value.

2. The hydraulic coupling of claim 1 wherein said control valve assembly includes a valve housing defining a valve chamber in fluid communication with the sump, and a flow port providing fluid communication between said piston chamber and said valve chamber, and wherein said thermal unload valve includes a thermal actuator mounted in said valve chamber and having a valve member movable from a first position to a second position when the temperature of the fluid in said valve chamber exceeds a predetermined temperature value, said valve member is operable in its first position to prevent fluid flow through said flow port and is further operable in its second position to permit fluid flow through said flow port for venting said piston chamber.

3. The hydraulic coupling of claim 1 wherein said control valve assembly further includes a pressure relief valve for venting fluid from said piston chamber to the sump when the fluid pressure in said piston chamber exceeds a predetermined maximum pressure value.

4. The hydraulic coupling of claim 1 wherein said control valve assembly further includes a flow control valve for regulating flow of hydraulic fluid from said piston chamber to the sump to control the fluid pressure in said piston chamber for actuating said piston.

5. The hydraulic coupling of claim 4 wherein said control valve assembly includes a valve housing defining a valve chamber in fluid communication with the sump, and a flow port providing fluid communication between said piston chamber and said valve chamber, and wherein said flow control valve is a valve element that is normally located in an open position displaced from said flow port and which moves to a closed position for blocking said flow port when a speed differential between the first and second rotary members exceeds a predetermined value, whereby such movement of said valve element to its closed position causes a pressure increase in said piston chamber for causing said piston to engage said transfer clutch.

6. The hydraulic coupling of claim 5 wherein said valve element is a bimetallic valve element adapted to thermally compensate for viscosity changes due to heating and cooling of the hydraulic fluid in said flow path.

7. The hydraulic coupling of claim 5 wherein said valve element is adapted to delay moving from its open position to its closed position when the first rotary element exceeds a predetermined rotary speed.

8. The hydraulic coupling of claim 1 wherein said transfer clutch includes a clutch pack having first clutch plates fixed for rotation with the first rotary member and second clutch plates fixed for rotation with the second rotary member, and wherein said piston engages said clutch pack to exert a clutch engagement force thereon in response to the fluid pressure in said piston chamber.

9. The hydraulic coupling of claim 8 wherein fluid vented from said piston chamber is directed to lubricate said first and second clutch plates prior to returning to the sump.

10. A hydraulic coupling for use in a driveline apparatus having a sump containing hydraulic fluid to rotatively couple first and second rotary members, the hydraulic coupling comprising:
    a transfer clutch connected between the first and second rotary members;
    a piston disposed in a piston chamber and actuatable to engage said transfer clutch and rotatively couple the first and second rotary members;
    a hydraulic pump for pumping hydraulic fluid from the sump to said piston chamber in response to relative rotation between the first and second rotary members; and
    a control valve assembly located in a flow path providing fluid communication between said piston chamber and the sump, said control valve assembly having a pressure relief valve for venting fluid from said piston chamber to the sump when the fluid pressure in said piston chamber exceeds a predetermined maximum pressure value.

11. The hydraulic coupling of claim 10 wherein said control valve assembly further includes a thermal unload valve for venting fluid from said piston chamber to the sump when the fluid temperature in said flow path exceeds a predetermined temperature value.

12. The hydraulic coupling of claim 10 wherein said control valve assembly further includes a flow control valve for regulating flow of hydraulic fluid from said piston chamber to the sump to control the pressure in said piston chamber for actuating said piston.

13. The hydraulic coupling of claim 12 wherein said control valve assembly includes a valve housing defining a valve chamber and a flow port providing fluid communication between said flow path and said valve chamber, and wherein said flow control valve is a valve element that is normally located in an open position displaced from said flow port and which moves to a closed position for blocking said flow port when a speed differential between the first and second rotary members exceeds a predetermined actuation value, whereby such movement of said valve element to its closed position causes a pressure increase in said piston chamber for actuating said piston to engage said transfer clutch.

14. The hydraulic coupling of claim 13 wherein said valve element is a bimetallic valve element adapted to thermally compensate for viscosity changes due to heating and cooling of the hydraulic fluid in said flow path.

15. The hydraulic coupling of claim 13 wherein said valve element is adapted to delay moving from its open position to its closed position when the first rotary element exceeds a predetermined rotary speed.

16. The hydraulic coupling of claim 10 further comprising a flow control chamber formed in said flow path between said piston chamber and the sump with said control valve assembly located in said flow control chamber, said control valve assembly including a valve housing which defines an internal valve chamber in fluid communication with the sump, and wherein said pressure relief valve includes a second piston disposed in said valve housing and having an aperture providing fluid communication between said piston chamber and said valve chamber, a valve member, and a spring for biasing said second piston to a first position with said valve member seated against said aperture to prevent fluid flow therethrough, and said second piston is operable to move to a second position for opening said aperture relative to said valve member when the fluid pressure acting on said second piston overcomes the biasing of said spring.

17. A hydraulic coupling for use in a driveline apparatus having a sump containing hydraulic fluid to rotatively couple first and second rotary members, the hydraulic coupling comprising:
    a clutch pack interconnecting the first and second rotary members;
    a pump for pumping hydraulic fluid from the sump to a piston chamber;
    a piston disposed in said piston chamber and operable to exert a clutch engagement force on said clutch pack the magnitude of which varies as a function of the fluid pressure in said piston chamber;
    a flow control valve for controlling the fluid pressure in said piston chamber; and
    a thermal unload valve for venting fluid from said piston chamber when the fluid temperature exceeds a predetermined temperature value.

18. The hydraulic coupling of claim 17 wherein said flow control valve and said thermal unload valve are associated with a control valve assembly mounted in a flow path between said piston chamber and the sump.

19. The hydraulic coupling of claim 18 wherein said control valve assembly includes a valve housing defining a valve chamber and a flow port providing fluid communication between said flow path and said valve chamber, and wherein said flow control valve is a valve element that is biased toward an open position displaced from said flow port and which moves to a closed position for blocking said flow port when a speed differential between the first and second rotary members exceeds a predetermined actuation value, whereby such movement of said valve element to its closed position causes a pressure increase in said piston chamber for causing said piston to exert an increased clutch engagement force on said clutch pack.

20. The hydraulic coupling of claim 19 wherein said valve element is a bimetallic valve element adapted to thermally compensate for viscosity changes due to heating and cooling of the hydraulic fluid in said flow path.

21. The hydraulic coupling of claim 18 wherein said control valve assembly includes a valve housing defining a valve chamber and a flow port providing fluid communication between said flow path and said valve chamber, and wherein said thermal unload valve includes a thermal actuator mounted in said valve chamber and having a valve member that is movable from a first position to a second position when the temperature of the fluid in said valve chamber exceeds a predetermined maximum value, said valve member is operable in its first position to prevent fluid flow through said flow port and is further operable in its second position to permit fluid to flow through said flow port from said piston chamber to the sump.

22. The hydraulic coupling of claim 17 further includes a pressure relief valve for venting fluid from said piston chamber to the sump when the fluid pressure in said piston chamber exceeds a predetermined maximum pressure value.

23. The hydraulic coupling of claim 22 wherein said flow control valve, said thermal unload valve, and said pressure relief valve are associated with a control valve assembly mounted in a flow path between said piston chamber and the sump.

24. The hydraulic coupling of claim 7 wherein said pump has a first pump component fixed for rotation with the first rotary member and a second pump component fixed for rotation with the second rotary member.

25. A hydraulic coupling for use in a driveline apparatus having a sump containing hydraulic fluid to rotatively couple first and second rotary members, the hydraulic coupling comprising:
   a clutch pack interconnecting the first and second rotary members;
   a pump for pumping hydraulic fluid from the sump to a piston chamber;
   a piston disposed in said piston chamber and operable to exert a clutch engagement force on said clutch pack which varies as a function of the fluid pressure in said piston chamber;
   a flow control valve for controlling the fluid pressure in said piston chamber; and
   a thermal unload valve for venting fluid from said piston chamber when the fluid temperature exceeds a predetermined temperature value.

26. The hydraulic coupling of claim 25 wherein said flow control valve and said thermal unload valve are associated with a control valve assembly mounted in a flow path between said piston chamber and the sump.

27. The hydraulic coupling of claim 26 wherein said control valve assembly includes a valve housing defining a valve chamber and a flow port providing fluid communication between said flow path and said valve chamber, and wherein said flow control valve is a valve element that is biased toward an open position displaced from said flow port and which moves to a closed position for blocking said flow port when a speed differential between the first and second rotary members exceeds a predetermined actuation value, whereby such movement of said valve element to its closed position causes a pressure increase in said piston chamber for causing said piston to exert an increased clutch engagement force on said clutch pack.

28. The hydraulic coupling of claim 27 wherein said valve element is a bimetallic valve element adapted to thermally compensate for viscosity changes due to heating and cooling of the hydraulic fluid in said flow path.

29. The hydraulic coupling of claim 25 wherein said pump has a first pump component fixed for rotation with the first rotary member and a second pump component fixed for rotation with the second rotary member.

30. The hydraulic coupling of claim 25 wherein said control valve assembly further includes a pressure relief valve for venting fluid from said piston chamber to the sump when the fluid pressure in said piston chamber exceeds a predetermined pressure value.

31. A hydraulic coupling for use in a driveline apparatus having a sump containing hydraulic fluid to rotatively couple first and second rotary members, the hydraulic coupling comprising:
   a transfer clutch connected between the first and second rotary members;
   a piston disposed in a piston chamber and actuatable to engage said transfer clutch and rotatively couple the first and second rotary members;
   a hydraulic pump for pumping hydraulic fluid from the sump to said piston chamber in response to relative rotation between the first and second rotary members; and
   a control valve assembly located in a flow path providing fluid communication between said piston chamber and the sump, said control valve assembly having a thermal unload valve for venting fluid from said piston chamber to the sump when the fluid temperature exceeds a predetermined maximum temperature value and a flow control valve for regulating flow of hydraulic fluid from said piston chamber to the sump to control the fluid pressure in said piston chamber for actuating said piston.

* * * * *

UNITED STATES PATENT AND TRADEMARK OFFICE
CERTIFICATE OF CORRECTION

PATENT NO. : 6,145,644
DATED : November 14, 2000
INVENTOR(S) : Sankar K. Mohan and Timothy M. Burns It is certified that error appears in the above-identified patent and that said Letters Patent is hereby corrected as shown below:

Column 11,
Line 2, "flew" should be -- flow --.
Line 38, "claim 7" should be -- claim 17 --.

Signed and Sealed this

Fourteenth Day of May, 2002

*Attest:*

JAMES E. ROGAN
*Attesting Officer*    *Director of the United States Patent and Trademark Office*